United States Patent
Rudd

[11] Patent Number: 5,814,791
[45] Date of Patent: Sep. 29, 1998

[54] ELECTRICAL APPARATUS WITH A VARIABLE CIRCUIT PROTECTION DEVICE

[75] Inventor: Wallace C. Rudd, New Canaan, Conn.

[73] Assignee: Littelfuse, Inc., Des Plaines, Ill.

[21] Appl. No.: 877,595

[22] Filed: Jun. 17, 1997

Related U.S. Application Data

[60] Provisional application No. 60/020,227 Jun. 18, 1996.

[51] Int. Cl.⁶ ..................................... H05B 1/02
[52] U.S. Cl. ......................... 219/504; 219/505; 219/508; 219/481; 338/22 R; 361/106
[58] Field of Search ..................... 219/504, 505, 219/481, 497, 501, 508, 509, 510; 338/22 R, 24, 25, 28, 330; 361/106

[56] References Cited

U.S. PATENT DOCUMENTS 4,238,812  12/1980  Middleman et al. .................. 361/106
4,450,496   5/1984  Doljack et al. ........................ 219/212
4,780,598  10/1988  Fahey et al. .......................... 219/511
5,064,997  11/1991  Fang et al. ........................... 219/505
5,148,005   9/1992  Fang et al. ........................... 219/505
5,471,035  11/1995  Holmes .................................. 219/505

*Primary Examiner*—Mark H. Paschall
*Attorney, Agent, or Firm*—Wallenstein & Wagner, Ltd.

[57] ABSTRACT

An electrical assembly (10) comprising a first electrical device (12) comprised of a non-linear resistant, temperature responsive element (14) and first and second electrodes (16,18), the device (12) being connectable to a first power supply (20) such that a first electrical current ($i_1$) travels through the resistive element (14) from the first electrode (16) to the second electrode (18). A second electrical circuit (24) is in electrical contact with the electrical device (12) such that the second circuit (24) may introduce a secondary electrical current ($i_2$) into a localized portion of the non-linear resistant element (14), the second current ($i_2$), when applied to the non-linear resistant element (14), causes the element (14) to change from a first resistant state to a second resistant state.

10 Claims, 3 Drawing Sheets

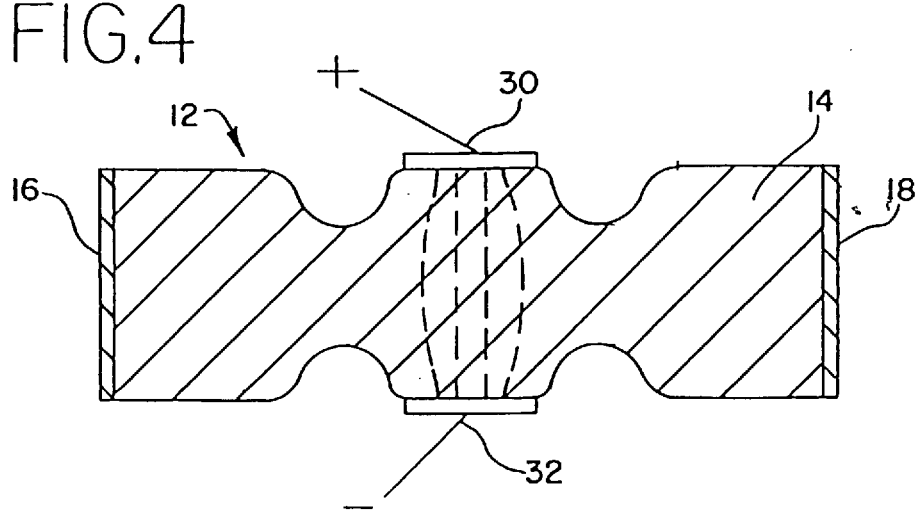
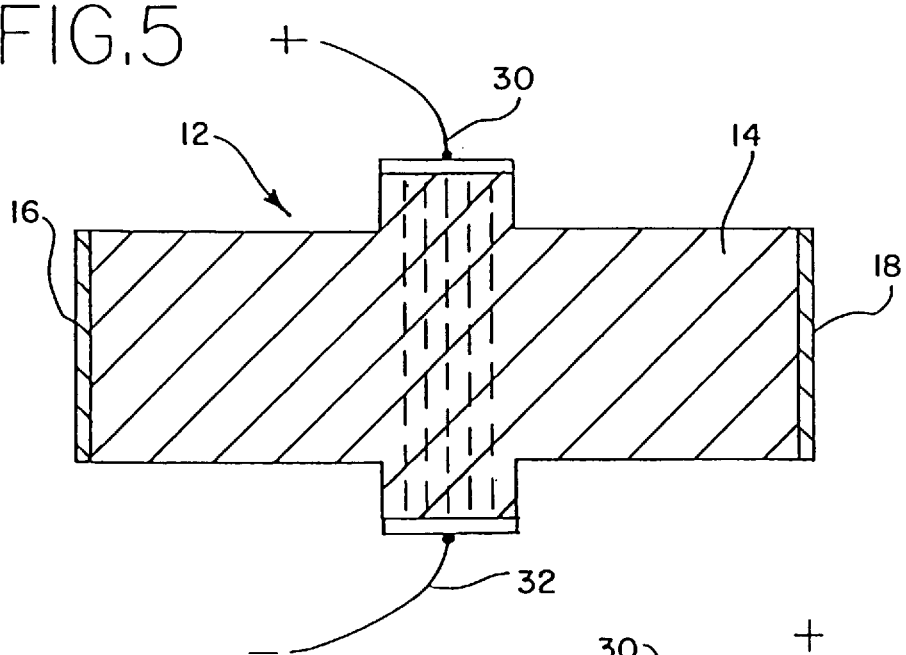
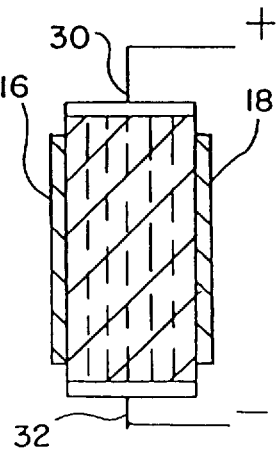

ELECTRICAL APPARATUS WITH A VARIABLE CIRCUIT PROTECTION DEVICE

CROSS REFERENCE TO RELATED APPLICATION

This application claims the benefit of U.S. Provisional Application No. 60/020,227, filed Jun. 18, 1996.

TECHNICAL FIELD

The present invention relates generally to a variable circuit protection device comprised of a non-linear resistant, temperature-responsive material. Specifically, a control circuit introduces a secondary current into the device causing it to change from a first resistant state to a second resistant state.

BACKGROUND OF THE INVENTION

It is well known that the resistivity of many conductive materials changes with temperature. For example, the resistivity of a positive temperature coefficient ("PTC") conductive material increases at a non-linear rate as the temperature of the material increases, while the resistivity of a negative temperature coefficient ("NTC") conductive material decreases at a non-linear rate as the temperature of the material increases.

Many crystalline polymers, made electrically conductive by dispersing conductive fillers therein, exhibit a PTC effect. These polymers generally include polyolefins such as polyethylene, polypropylene and ethylene/propylene copolymers. At temperatures below a certain value, i.e., the critical or trip temperature, the polymer exhibits a relatively low, constant resistivity. However, as the temperature of the polymer increases beyond this point, the resistivity of the polymer sharply increases.

Polymer PTC materials have been previously used in electrical circuit protection devices to provide overcurrent protection to electrical components of a circuit. Under normal operating conditions in the electrical circuit, relatively little current flows through the PTC device. Thus, the temperature of the device (due to internal $I^2R$ heating) remains below the critical or trip temperature. If a resistive load in the circuit is shorted or if the circuit experiences a power surge, the current flowing through the PTC device increases greatly and temperature (due to internal $I^2R$ heating) of the device rises rapidly to its critical temperature. As a result, the resistance of the PTC device greatly increases, effectively limiting the current flow in the circuit to a fraction of its original value. This negligible current value is enough to maintain the PTC device at a new, high temperature/high resistance equilibrium state, and will not damage the electrical components of the circuit. PTC devices will also change to a high resistant state as a result of an increase in ambient temperature.

The PTC device will remain in its high resistant state until the device cools to a temperature below its critical temperature (e.g., by interrupting the current in the circuit, removing the condition responsible for the short circuit (or power surge), or decreasing the ambient temperature). Accordingly, the effect is a resettable, electrical circuit protection device.

Prior attempts have been made to influence the response time of a PTC device (i.e., the time it takes the PTC device to change from its normal relatively-low resistance state to its high-resistance, high-temperature state) by artificially increasing the ambient temperature, thus, reducing the response time of the device. Generally, these attempts have included thermally coupling a second electrical component to the PTC device. Examples of these prior attempts are disclosed in U.S. Pat. Nos. 4,101,862, 4,450,496, 4,780,598, 5,064,997, 5,089,688 and 5,148,005.

SUMMARY OF THE INVENTION

I have now discovered that the response time of an electrical device comprising a non-linear resistant, temperature-responsive material can be accurately controlled by introducing a secondary current into a localized area of the material causing it to change from a first resistant state to a second resistant state. In the case of a PTC device, the material changes from a normal operating, low resistant state to a high resistant state.

I have also discovered that the sensitivity of a PTC device to fault conditions can be varied by introducing a secondary current into the device. The secondary current and the main current keep the device at a new equilibrium point which is closer to the critical point of the PTC device. Thus, the PTC device will respond to slight variations in current or temperature.

Accordingly, in a first aspect the present invention provides an electrical assembly comprising:

(a) a first electrical device comprised of a non-linear resistant, temperature responsive element and first and second electrodes, the device being connectable to a first power supply such that a first electrical current travels through the resistive element from the first electrode to the second electrode; and (b) a second circuit in electrical contact with the electrical device such that the second circuit may introduce a secondary electrical current into a localized portion of the non-linear resistant element, the secondary current, when applied to the non-linear resistant element, causes the element to change from a first resistant state to a second resistant state.

In accordance with a second aspect of the present invention, the electrical assembly comprises:

(a) a circuit protection device which is in series with a resistive load and a first power supply, the device comprising a conductive polymer composition exhibiting PTC behavior and two electrodes which when connected to the first power supply cause a first electrical current to travel through the conductive polymer PTC composition; and (b) a control circuit in electrical contact with the device such that the control circuit may introduce a secondary electrical current into the conductive polymer PTC composition causing the PTC composition to change from a low resistant state to a high resistant state.

Other advantages and aspects of the present invention will become apparent upon reading the following description of the drawings and detailed description of the present invention.

BRIEF DESCRIPTION OF THE DRAWINGS

In order that the present invention may be understood, it will now be described by way of example, with reference to the accompanying drawings in which:

FIG. 4 is an exploded view of the non-linear resistant, temperature-responsive element illustrated in FIG. 1 according to a third embodiment of the present invention;

FIG. 5 is an exploded view of the non-linear resistant, temperature-responsive element illustrated in FIG. 1 according to a fourth embodiment of the present invention;

FIG. 6 is an exploded view of the non-linear resistant, temperature-responsive element illustrated in FIG. 1 according to a fifth embodiment of the present invention.

DETAILED DESCRIPTION OF THE PREFERRED EMBODIMENT

Figure 1:
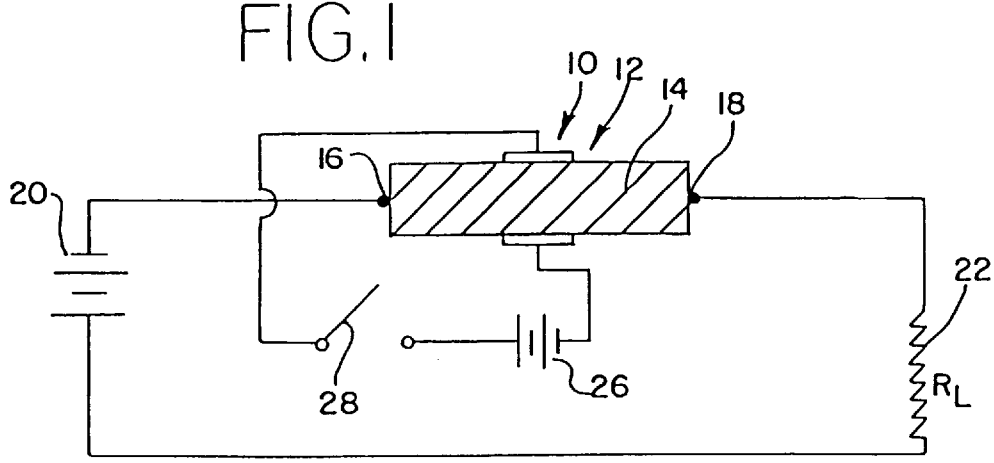
FIG. 1 is a schematic diagram according to a preferred embodiment of the electrical assembly of the present invention.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

The electrical apparatus of a first embodiment of the present invention, generally designated by reference numeral 10 is illustrated in FIG. 1. The electrical apparatus 10 comprises a first electrical device 12 composed of a non-linear resistant, temperature-responsive element 14 and first and second main electrodes 16, 18. The device 12 is connected in series with a first power supply 20 and a resistive load 22. Accordingly, a first electrical current, $i_1$, travels through the element 14 from the first electrode 16 to the second electrode 18.

A second electrical circuit 24 is electrically connected to the electrical device 12 such that a secondary electrical current, $i_21$ is introduced into a localized portion of the non-linear resistant, temperature-responsive element 14. The value of the secondary current can be predetermined so that when it is applied to the element 14, the second current causes the element 14 to change from a first resistant state to a second resistant state. In the preferred embodiment illustrated in FIG. 1, the second electrical circuit includes a variable power supply 26 and a switch 28. Accordingly, the amount and the introduction of the secondary current into the non-linear resistant, temperature-responsive element 14 can be controlled.

In a preferred embodiment, the non-linear resistant, temperature-responsive element 14 is composed of a conductive polymer composition exhibiting PTC behavior. It should be understood, however, that the non-linear resistant, temperature-responsive element may also comprise a composition exhibiting NTC behavior.

In the case of a poymer PTC element, the composition will preferably comprise a crystalline polymer having conductive particles dispersed therein. Generally the polymer will comprise a polyolefin selected from the group consisting of polyethylene, polypropylene, copolymers of polyethylene and ethylene/propylene copolymers. Preferably, the conductive particles comprise carbon black.

Suitable PTC compositions and PTC elements for use in the present invention are disclosed in U.S. patent application Ser. Nos. 08/437,966 (filed May 10, 1995) and 08/614,038 (filed Mar. 12, 1996) and U.S. Pat. Nos. 4,237,441, 4,689, 475 and 4,800,253. These applications and patents are specifically incorporated herein by reference.

Figure 2:
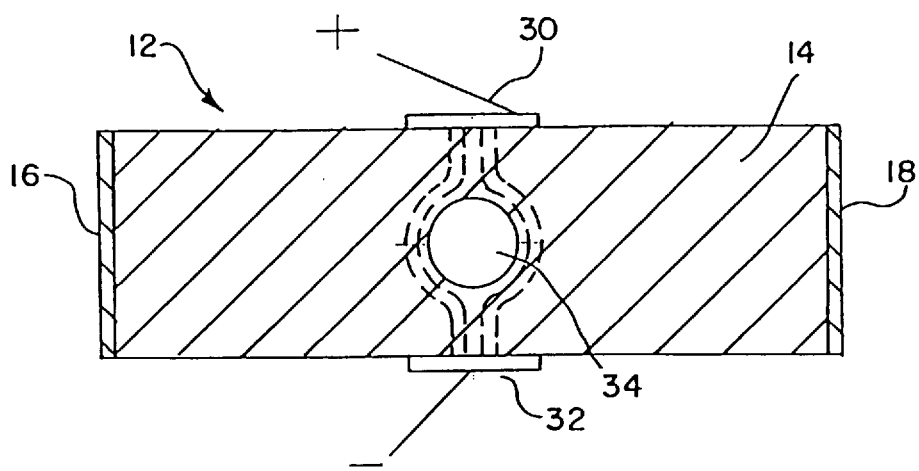
FIG. 2 is an exploded view of the non-linear resistant, temperature-responsive element illustrated in FIG. 1 according to a first embodiment of the present invention.
Figure 3:
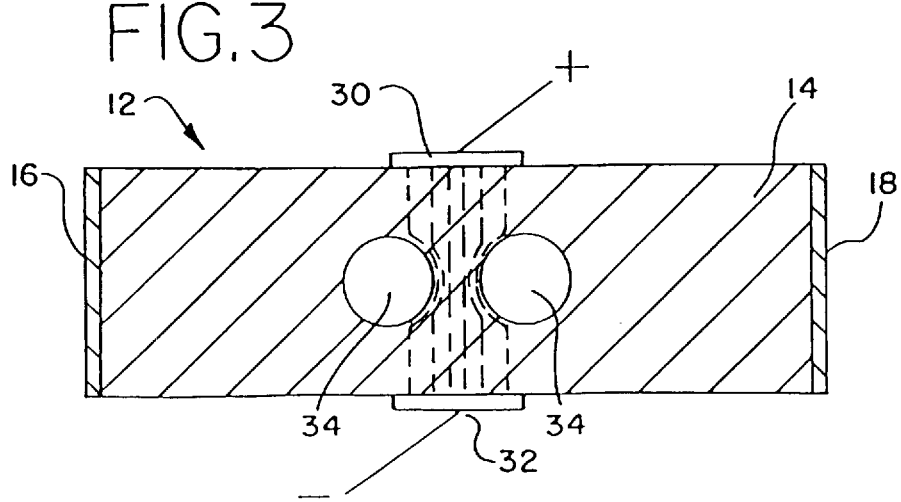
FIG. 3 is an exploded view of the non-linear resistant, temperature-responsive element illustrated in FIG. 1 according to a second embodiment of the present invention.

FIGS. 2–6 illustrate various preferred embodiments of the PTC device 12. In FIGS. 2–3 the device 12 has first 16 and second 18 electrodes separated by the PTC element 14. The second circuit makes a positive electrical connection 30 to the top of the PTC element 14 and a negative electrical connection 32 to the bottom of the PTC element. The positive and negative connections 30, 32 can be made by any conventional termination method, including plating the PTC element 14 with a conductive material. Center portions 34 of the PTC element 14 can be removed to alter the electrical power/temperature relationship of the PTC element in a localized area. Particularly in FIG. 3, the secondary current (represented by dashed lines) becomes concentrated in a small localized area of the PTC element 14. As a result, a great deal of heat is generated in a small area and the response time of the PTC element 14 (i.e., the time it takes to switch from a normal low resistance state to a high resistance, high temperature state) can be reduced and more accurately controlled.

FIGS. 4–6 illustrate additional embodiments of the PTC device 12. It has been determined that by varying physical parameters of the PTC element 14 such as the cross-sectional area and the length of the current path between the electrical connections of the second circuit, one can also alter the response time of the PTC element 14. For example, by increasing the cross-sectional area between the positive and negative connections 30, 32 and by shortening the current path between the connections 30, 32 one can quickly heat a localized portion of the PTC element 14, and thus, effectively limit the current flow through the device 12.

In the embodiments illustrated in FIG. 2–6, the first electrical current flows through the non-linear resistant element 14 at an angle, $\theta_1$, and the secondary electrical current flows through the non-linear resistant element at an angle, $\theta_2$. In a preferred embodiment, the first and second current flows are such that $\theta_1$ is not equal to $\theta_2$. In a more preferred embodiment, the seconadry current will flow through the element 14 at a 90° angle to the flow of the first current.

Electrical assemblies of the present invention can have various applications. First, a second circuit can be arranged to introduce a secondary current that is relatively large compared to the first current which will flow through the PTC device under normal operating conditions. Consequently, as soon as the secondary current is applied to the PTC device, the rate at which the device generates $i^2R$ heat exceeds the rate at which the PTC device can lose heat to its surroundings. Thus, the temperature and the resistance of the PTC device will rise rapidly. The new high resistance state of the PTC device will effectively limit the flow of both the first and secondary currents through the device. By predetermining a large enough secondary current, one can almost instantly limit the current flow through the device.

Figure 7:
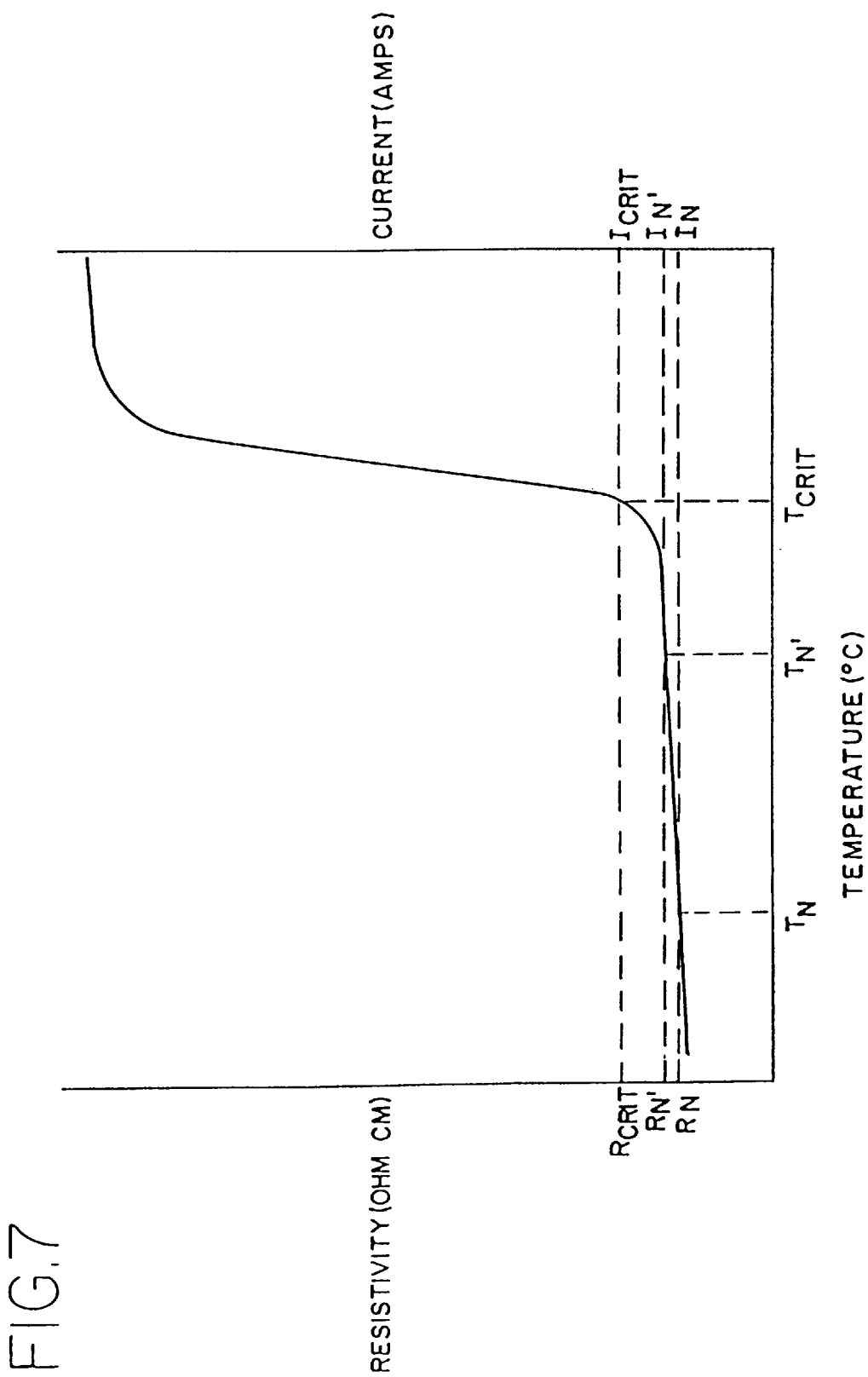
FIG. 7 is a graphical representation of the electrical power/temperature relationship of an electrical assembly according to the present invention.

In another application, one may change the sensitivity of a PTC device to fault conditions which are known to exist in a given environment. For example, with reference to FIG. 7, a first electrical circuit comprises a PTC device electrically connected in series with a resistive load and a first power supply. The circuit has a normal operating condition in which a current, $i_n$, flows through the PTC device. At this point, the device has a normal operating temperature, $T_n$, and a normal operating resistance, $R_n$. During the normal operating condition of the circuit, there is a stable equilibrium between a rate at which the PTC device generates heat by $I^2R$ heating and a rate at which heat is lost from the device.

The PTC device has an electrical power/temperature relationship such that if a fault condition (e.g., power surge, short circuit, increase in ambient temperature) is introduced into the circuit the current flowing through the PTC device increases from $i_n$ and the temperature of the PTC device increases from $T_n$ until the stable equilibrium between the rate at which the device generates heat by $I^2R$ heating and the rate at which heat is lost from the device becomes unstable. At this unstable point the current flowing through the PTC device is $i_{crit}$, and the PTC device has a critical temperature, $T_{crit}$, and a critical resistance, $R_{crit}$.

At this point, if the fault condition that was introduced into the circuit continues and the current flowing through the PTC device increases to a point greater than $i_{crit}$ (or the temperature of the PTC device increases to a point greater than $T_{crit}$), the rate at which the device generates heat by $I^2R$ heating will exceed the rate at which heat can be lost from the device. Accordingly, the temperature and the resistance of the PTC device will rise rapidly and the circuit current will fall until a high temperature, high resistance stable equilibrium point is reached. At this new stable equilibrium point the rate at which the PTC device generates heat by $I^2R$ heating is equal to the rate at which heat can be lost from the PTC device, and the device has a resistance, $R_{high}$, and a temperature, $T_{high}$. Due to the high resistance of the PTC device, the current is limited to a new value, $i_{limit}$, which is a fraction of the normal operating current.

A second power supply is placed in electrical contact with the PTC device such that the second power supply may introduce a secondary electrical current, $i_{sec}$, into the PTC device. The secondary electrical current should be small enough so that $i_{sec}+i_n$ is less than $i_{crit}$. The increased current flowing through the PTC device (i.e., $i_{sec}+i_n$) causes the $I^2R$ heat generated by the PTC device to increase. However, since the increased current is less than $i_{crit}$, the rate at which the PTC device generates heat by $I^2R$ heating can be lost to the surroundings. Accordingly, a new normal operating condition is achieved where the PTC device has a temperature $T_{n'}$, which is between $T_n$ and $T_{crit}$ and a resistance $R_{n'}$, which is between $R_n$ and $R_{crit}$.

Since the new normal operating condition is closer to the critical point of the PTC device, it will now take less of a temperature or current increase to push the PTC device past its critical point to its high-temperature, high-resistance state. It will be understood by those having skill in the art that one can vary the secondary current to achieve any new operating condition between the normal operating condition of the first circuit (without any influence from the secondary power supply) and the critical point of the PTC device.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

What I claim is:

1. An electrical assembly comprising:
   (a) a first electrical device comprised of a non-linear resistant, temperature responsive element and first and second electrodes, the device being connectable to a first power supply such that a first electrical current travels through the resistive element from the first electrode to the second electrode; and
   (b) a second circuit in electrical contact with the electrical device such that the second circuit may introduce a secondary electrical current into a localized portion of the non-linear resistant element, the second current, when applied to the non-linear resistant element, causes the element to change from a first resistant state to a second resistant state.

2. The electrical assembly of claim 1 wherein the non-linear resistant element exhibits PTC behavior.

3. The electrical assembly of claim 1 wherein the non-linear resistant element exhibits NTC behavior.

4. The electrical assembly of claim 2 wherein the resistive element comprises a polymer composition having conductive particles dispersed therein.

5. The electrical assembly of claim 4 wherein the composition comprises a polymer selected from the group consisting of polyethylene, polypropylene, copolymers of polyethylene and ethylene/propylene copolymers.

6. The electrical assembly of claim 4 wherein the conductive particles comprise carbon black.

7. The electrical assembly of claim 2 wherein the first electrical current flows through the non-linear resistant element at an angle, $\theta_1$, and the second electrical current flows through the non-linear resistant element at an angle, $\theta_2$, the first and second current flows being such that $\theta_1$ is not equal to $\theta_2$.

8. The electrical assembly of claim 2 wherein the control circuit comprises a variable power supply.

9. An electrical assembly comprising:
   (a) a circuit protection device which is in series with a resistive load and a first power supply, the device comprising a conductive polymer composition exhibiting PTC behavior and two electrodes which when connected to the first power supply cause a first electrical current to travel through the conductive polymer PTC composition; and
   (b) a control circuit in electrical contact with the device such that the control circuit may introduce a secondary electrical current into the conductive polymer PTC composition causing the PTC composition to change from a low resistant state to a high resistant state.

10. An electrical assembly comprising:
   (a) a first electrical circuit comprising a PTC circuit protection device composed of a conductive polymer composition and two electrodes, the PTC device being electrically connected in series with a resistive load and a first power supply;
      (1) the circuit having a normal operating condition in which a current, $i_n$, flows through the PTC device and the device has a temperature, $T_n$, and the PTC device has a resistance, $R_n$, there is a stable equilibrium between a rate at which the PTC device generates heat by $I^2R$ heating and a rate at which heat is lost from the device, and the device having an electrical power/temperature relationship such that if a fault condition is introduced into the circuit;
      (2) the current flowing through the PTC device increases from $i_n$ and the temperature of the PTC device increases from $T_n$ until the stable equilibrium between the rate at which the device generates heat by $I^2R$ heating and the rate at which heat is lost from the device becomes unstable, at which unstable equilibrium point the current flowing through the PTC device is $i_{crit}$, and the PTC device has a critical temperature, $T_{crit}$, and a critical resistance, $R_{crit}$;
      (3) if the fault condition introduced into the circuit continues and the current flowing through the PTC device increases to a point greater than $i_{crit}$, the rate at which the device generates heat by $I^2R$ heating exceeds the rate at which heat can be lost from the device, thus, causing the temperature and the resistance of the PTC device to rise rapidly and the circuit current to decrease until a high temperature, high resistance stable equilibrium point is reached at which the rate at which the PTC device generates heat by $I^2R$ heating is equal to the rate at which heat can be lost from the PTC device, at the high temperature, high resistance stable equilibrium point the device has a resistance, $R_{high}$, and a temperature, $T_{high}$, and a limited current, $i_{limit}$, flows through the device; and (b) a second circuit in electrical contact with the PTC device such that the second circuit may introduce a secondary electrical current, $i_{sec}$, into the PTC device such that $i_{sec}+i_n$ is less than $i_{crit}$, the increased current flowing through the PTC device causes the $I^2R$ heat generated by the PTC device to increase thus creating a new normal operating condition where the PTC device has a temperature $T_n$, which is between $T_n$ and $T_{crit}$ and a resistance $R_n$, which is between $R_n$ and $R_{crit}$.

* * * * *